United States Patent
Tamaru et al.

(10) Patent No.: US 6,549,336 B2
(45) Date of Patent: Apr. 15, 2003

(54) OPTICAL LOW PASS FILTER

(75) Inventors: Masaya Tamaru, Saitama (JP); Kazuya Oda, Saitama (JP); Takeshi Misawa, Saitama (JP); Yasunobu Kayanuma, Saitama (JP); Masaaki Orimoto, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 71 days.

(21) Appl. No.: 09/769,495

(22) Filed: Jan. 26, 2001

(65) Prior Publication Data

US 2001/0017741 A1 Aug. 30, 2001

(30) Foreign Application Priority Data

Jan. 26, 2000 (JP) .......................... 2000-016848

(51) Int. Cl.[7] .............................. G02B 27/28; G02B 5/30
(52) U.S. Cl. ..................... 359/494; 359/495; 359/497; 348/342; 348/264; 348/290; 378/98.8
(58) Field of Search .............................. 359/497, 498, 359/494, 495; 348/336, 342, 264, 265, 290; 378/98.8

(56) References Cited

U.S. PATENT DOCUMENTS 4,388,128 A * 6/1983 Ogawa ..................... 156/64
5,477,381 A * 12/1995 Sasaki ..................... 359/497

FOREIGN PATENT DOCUMENTS

| JP | 2564326 | 9/1993 |
| JP | 22775873 | 5/1998 |

* cited by examiner

*Primary Examiner*—Audrey Chang
*Assistant Examiner*—Leo Boutsikaris
(74) *Attorney, Agent, or Firm*—Birch, Stewart, Kolasch, & Birch, LLP

(57) ABSTRACT

An optical low-pass filter for a solid-state image sensor of an offset sampling structure is constituted of first and second optical members. The first optical member splits an incident light ray into a rectilinear ray and a refracted ray whose propagation direction is about 45° to a horizontal direction of the solid-state image sensor. The second optical member splits an incident ray into a rectilinear ray and a refracted ray whose propagation direction is about 90° to the horizontal direction. The optical low-pass filter having this configuration splits the incident light ray into four rays whose split points are at respective corners of a parallelogram. Assuming that Px represents a sampling interval in the horizontal direction, Py represents a sampling interval in the vertical direction, and D1 and D2 represent respective split widths of the incident light rays through the first and second optical members, the split widths D1 and D2 satisfy the following conditions: $D1 \approx Px/\sqrt{2}$ and $Py \leq D2 \leq 2 \cdot Py$.

7 Claims, 8 Drawing Sheets

OPTICAL LOW PASS FILTER

BACKGROUND OF THE INVENTION

1. Field of the Invention

The present invention relates to an optical low-pass filter that is placed in front of a solid state image sensor having an offset sampling structure, for eliminating high-frequency components from incident light.

2. Background Arts

The solid-state image sensor has an array of photo sensor cells, called pixels, for obtaining an image signal through discrete sampling and photoelectric conversion of an optical image of a subject. According to the sampling theorem, higher frequency components than a Nyquist rate, that is one half of a spatial frequency determined by the pitch of arrangement of the pixels, cause the aliasing noise. Since the aliasing noise appears in the form of spurious signal or moiré, it is necessary to eliminate the higher frequency components prior to the sampling. For this purpose, an optical low-pass filter is placed in front of the solid-state image sensor in an imaging apparatus.

As the optical low-pass filters, those utilizing double refraction or birefringence of the crystal are widely used. An exemplary of the optical low-pass filter is disclosed in Japanese Laid-open Patent Application No. 60-164719, which efficiently suppresses the higher frequency components of light incident on a solid-state image sensor having a square grid structure. This optical low-pass filter uses three crystal plates in combination, and splits the incident light ray into eight rays with equal intensity.

On the other hand, a solid-state image sensor having a so-called offset sampling structure has been developed and introduced in practice, for the sake of improving optical resolution. In the offset sampling structure, pixels of one row are shifted from adjacent rows in a horizontal scanning direction of the solid-state image sensor by an amount corresponding to half a pitch or sampling interval in the horizontal scanning direction.

Figure 13:
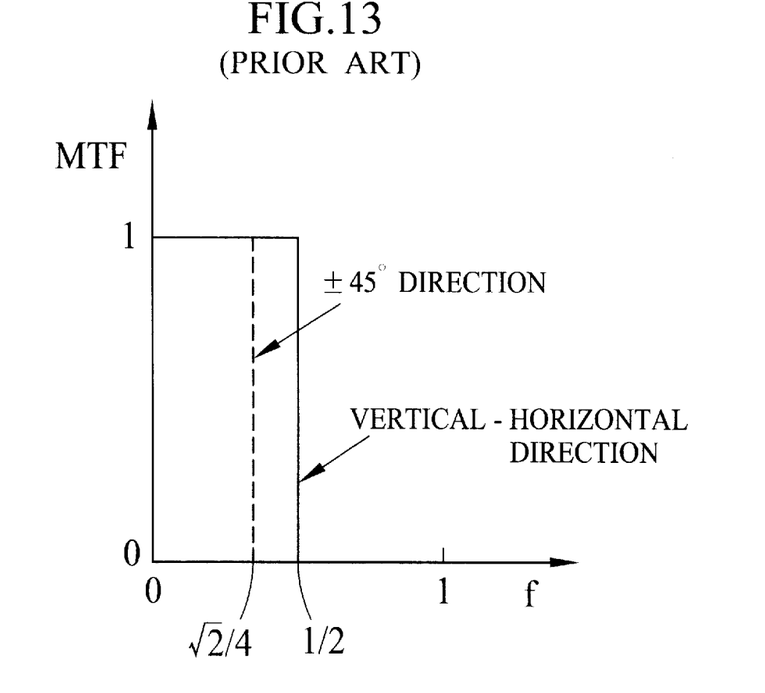
FIG. 13 is a graph illustrating ideal MTF curves of the optical low-pass filter for the solid-state image sensor of the offset sampling structure.

FIG. 13 shows ideal frequency characteristics or ideal modulation transfer function (MTF) curves of the optical low-pass filter for the solid-state image sensor of the offset sampling structure where the pitch in the horizontal scanning direction is twice a pitch of the pixel in the vertical direction. In FIG. 13, "f" represents a frequency standardized by the pitch in the horizontal direction. The MTF is standardized such that the MTF value of the direct current component (f=0) is 1. The curve shown by a solid line represents the characteristics in the parallel or the vertical direction to the horizontal scanning direction, whereas the curve shown by dashed lines represents the characteristics in the directions of ±45° to the horizontal scanning direction.

Figure 14:
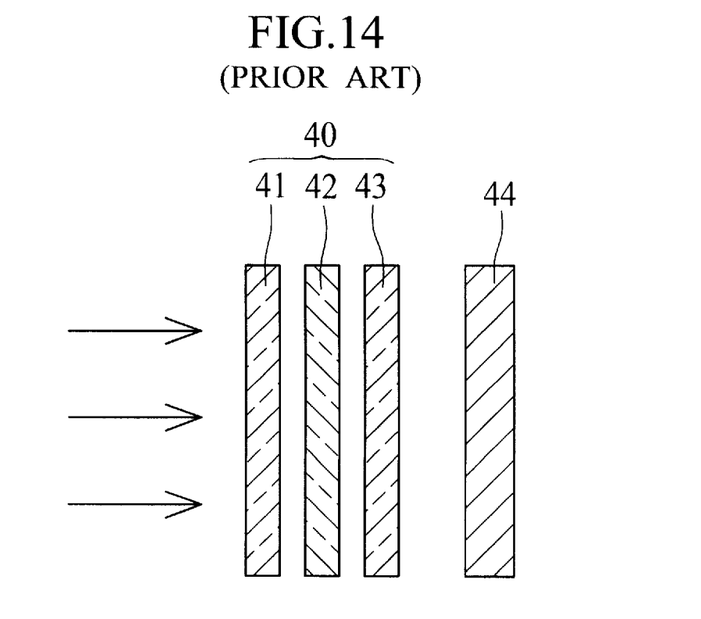
FIG. 14 is a sectional view of an optical low-pass filter of a prior art.

Because the ideal frequency characteristics of the optical low-pass filter for the solid-state image sensor of the offset sampling structure are different from those for the solid-state image sensor of the square grid structure, the optical low-pass filter for the solid-state image sensor of the square grid structure cannot efficiently suppress the aliasing noise. Japanese Laid-open Patent Application No. 3-46615 discloses an optical low-pass filter for the solid-state image sensor of the offset sampling structure, which uses optical members splitting the incident light in directions of ±45° to the horizontal scanning direction, in combination. As shown in FIG. 14, the optical low-pass filter 40 of this prior art is composed of three optical members 41, 42 and 43 that are placed in front of a solid-state image sensor 44.

Figure 15A:
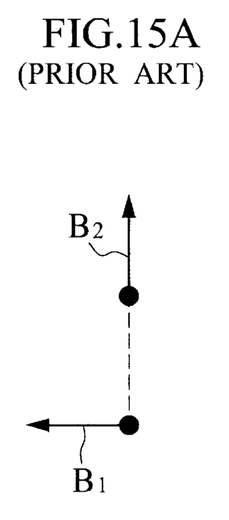
FIGS. 15A, 15B and 15C are explanatory diagrams illustrating processes of splitting rays through the optical low-pass filter of FIG. 14.
Figure 15B:
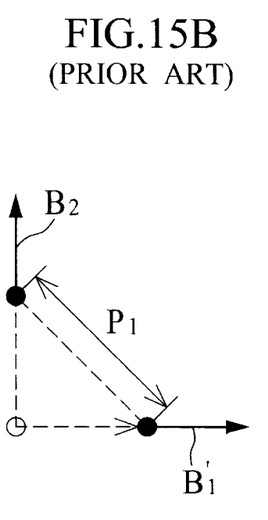
Figure 15C:
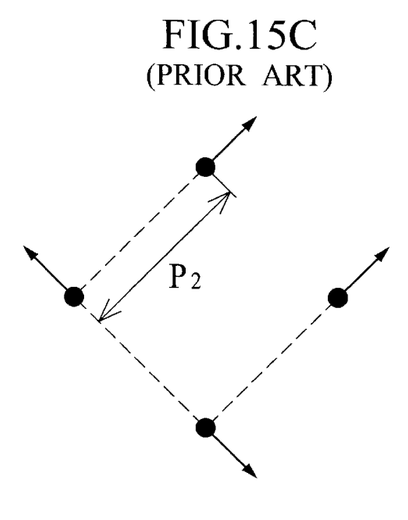
Figure 16:
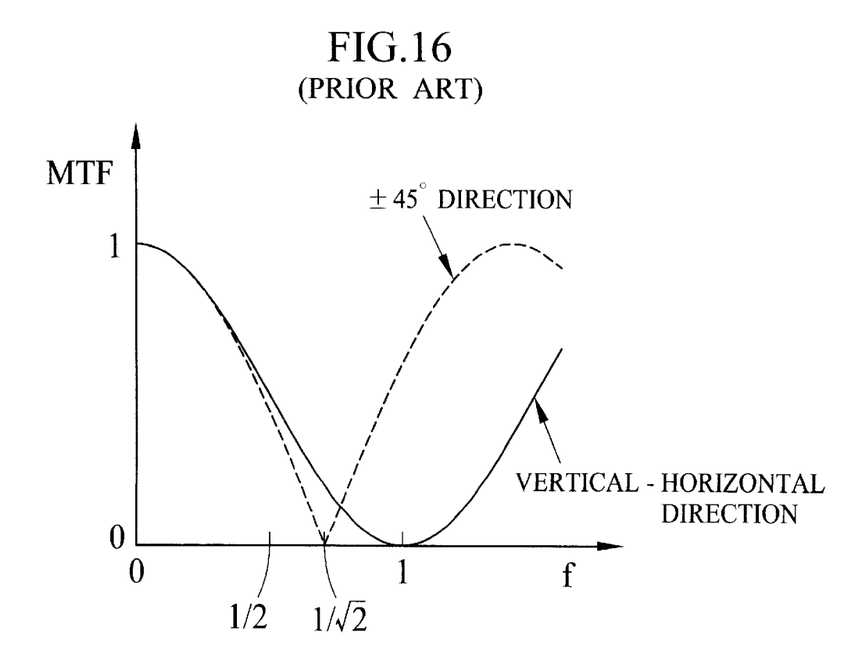
FIG. 16 is a graph illustrating MTF curves of the optical low-pass filter of FIG. 14.

FIGS. 15A, 15B and 15C illustrate the splitting process of the incident light through the first to third optical members 41 to 43 of the optical low-pass filter 40, respectively. The first optical member 41 is a birefringent plate that splits an incident ray into an ordinary or rectilinear ray B1 and an extraordinary ray B2 that is refracted in the direction of ±90° to the horizontal scanning direction. The second optical member 42 is a birefringent plate whose optic axis is inclined by 90° to that of the first optical member 41, so the ray B2 travels straightly through the second optical member 42, whereas the ray B1 is refracted in the direction parallel to the horizontal scanning direction, and projected at a point B1'. The third optical member 43 is a birefringent plate that splits a ray in the direction of +45° to the horizontal scanning direction by a split width of P2. As a result, the incident light is split into two rays in the direction of −45° to the horizontal scanning direction by a split width of P1 through the first and second optical members 41 and 42, and thereafter split into four rays through the third optical member 43.

Where the split width P1 in the direction of −45° and the split width P2 in the direction of +45° are equal to each other, the optical low-pass filter 40 has frequency characteristic curves as shown in FIG. 16. As seen from these curves, the higher frequency components of the incident light are effectively suppressed in either direction, though it is incomplete in comparison with the ideal characteristics shown in FIG. 13.

Recently, a demand for minimizing the solid-state imaging device and thus making the apparatus handy and portable is increased. Since the conventional optical low-pass filter such as disclosed in the above mentioned prior arts needs three birefringent plates, it has been difficult to minimize the optical low-pass filter, and the conventional optical low-pass filter is relatively expensive.

SUMMARY OF THE INVENTION

In view of the foregoing, an object of the present invention is to provide an optical low pass filter for a solid-state image sensor of the offset sampling structure, that is compact and may be produced at a low cost, but suppress the higher frequency components of the incident light with high efficiency.

According to the present invention, an optical low-pass filter for a solid-state image sensor of an offset sampling structure comprises a first optical member that splits an incident light ray into a rectilinear ray and a refracted ray whose propagation direction is about 45° or about −45° to the horizontal direction; and a second optical member that splits an incident ray into a rectilinear ray and a refracted ray whose propagation direction is about 90° or about −90° to the horizontal direction.

Since the optical low-pass filter of the present invention needs only two optical members, it contributes to reducing the thickness and the cost of the solid-state imaging apparatus.

On the assumption that pixels of the solid-state image sensor are arrayed at a pitch Px in a horizontal direction and at a pitch Py in a vertical direction, and are shifted by an offset amount of Px/2 in the horizontal direction from the pixels of the adjacent rows, it is preferable to define respective split widths D1 and D2 of the incident light rays through the first and second optical members to satisfy the following conditions:

$$D1 \approx Px/\sqrt{\sqrt{2}}$$

$$Py \leq D2 \leq 2 \cdot Py$$

According to a preferred embodiment, the second optical member is bonded to a front side of the solid-state image sensor, instead of a conventional glass protection plate. Thereafter, the first optical member is mounted in front of the second optical member. Thereby, the thickness of the solid-state imaging apparatus is still more reduced.

It is preferable to provide each of the first and second optical members and the solid-state image sensor with a positioning notch or a positioning mark. By aligning the positioning notches or marks with each other, the first and second optical members are positioned properly relative to the solid-state image sensor without fail.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
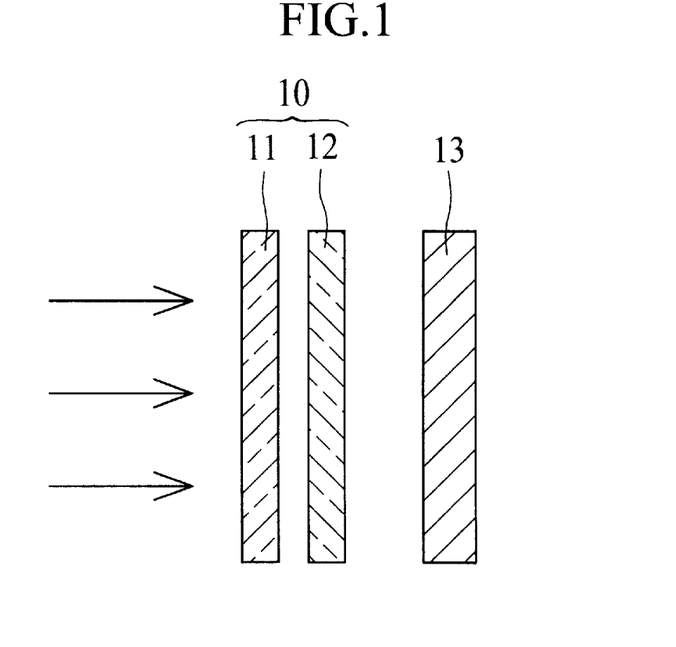
FIG. 1 is a sectional view of an optical low-pass filter of the present invention placed in front of a solid-state image sensor.
Figure 2:
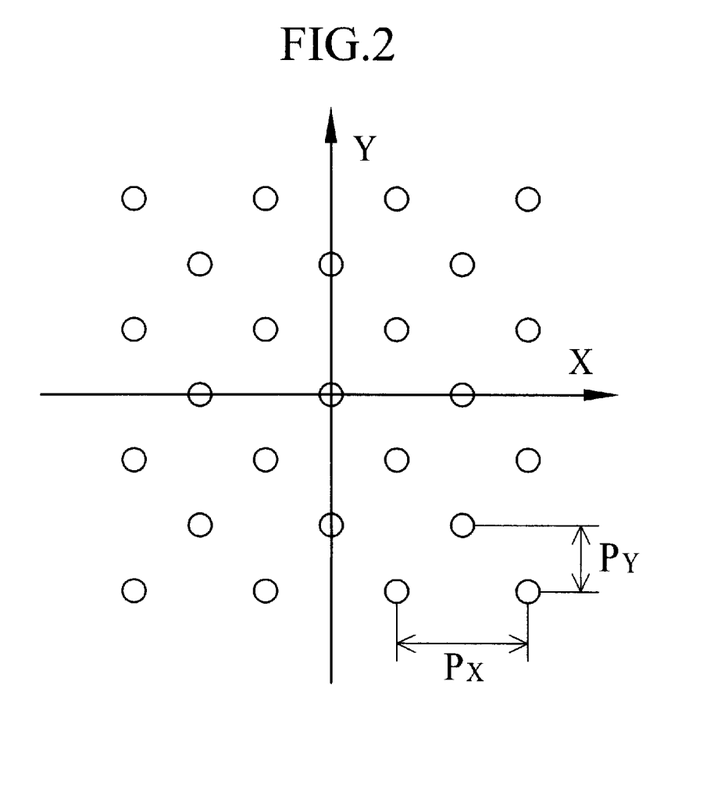
FIG. 2 is a graph illustrating the offset sampling structure of pixels of the solid-state image sensor.

FIG. 1 shows a configuration of an optical low-pass filter 10 of the present invention. The optical low-pass filter 10 consists of first and second optical members 11 and 12 arranged in this order from the object side in front of a solid-state image sensor 13. The solid-state image sensor 13 has an offset sampling structure like as shown in FIG. 2, wherein X-axis corresponds to a horizontal scanning direction of the solid-state image sensor 13, and Y-axis corresponds to a vertical direction. In the present embodiment, the pitch Px of pixels of the solid-state image sensor 13 in the horizontal scanning direction is twice the pitch Py in the vertical direction: Px=2·Py. In the following description, splitting angles of the optical low-pass filter will be defined with respect to the horizontal scanning direction.

Figure 3A:
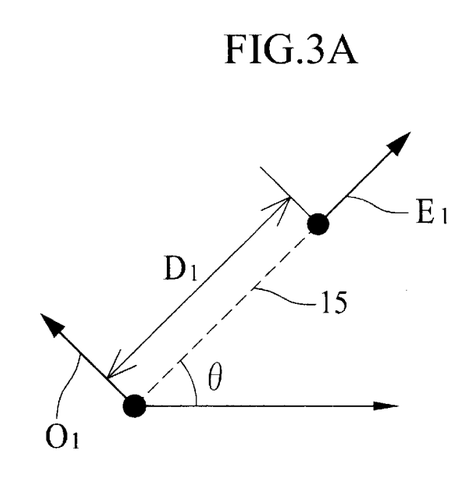
FIG. 3A is an explanatory diagram illustrating the double refraction properties of a first optical member of the optical low-pass filter according to a first embodiment of the present invention.
Figure 3B:
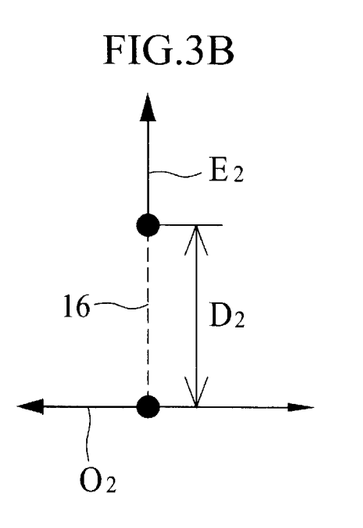
FIG. 3B is an explanatory diagram illustrating the double refraction properties of a second optical member of the optical low-pass filter according to the first embodiment of the present invention.

The optical members 11 and 12 are formed by cutting a birefringent material, such as rock crystal, lithium niobate, in predetermined directions. As shown in FIG. 3A, the first optical member 11 splits an incident ray into an ordinary ray O1 and an extraordinary ray E1 having the same intensity from each other. In FIG. 3A, the incident ray is assumed to fall on a point on the X-axis perpendicularly to the plane of the drawing. The ordinary ray means a ray that is perpendicular to a principal plane of a birefringent plate, and the extraordinary ray means a ray that is parallel to the principal plane, whereas the principal plane means a plane that includes the ordinary ray and the extraordinary ray and is parallel to the ray incident direction. In the shown embodiment, the principal plane 15 of the first optical member 11 inclines at +45° to the horizontal scanning direction that corresponds to the X-axis. On the other hand, as shown in FIG. 3B, the second optical member 12 splits an incident ray into an ordinary ray O2 and an extraordinary ray E2 having the same intensity from each other. Also in FIG. 3B, the incident ray is assumed to fall on a point on the X-axis perpendicularly to the plane of the drawing. According to the present embodiment, the principal plane 16 of the second optical member 12 is +90° to the horizontal scanning direction.

The split width D1 of the first optical member 11 and the split width D2 Of the second optical member 12 are adjustable by the thickness of the respective optical members 11 and 12. According to the present embodiment, the split widths D1 and D2 are defined as follows:

$D1 \approx Px/\sqrt{2}$, $D2 = Py$

Figure 4A:
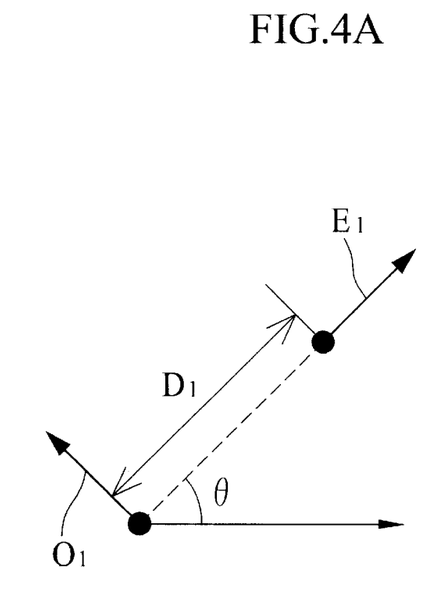
FIGS. 4A and 4B are explanatory diagrams illustrating a process of splitting an incident ray through the optical low-pass filter of FIG. 1.
Figure 4B:
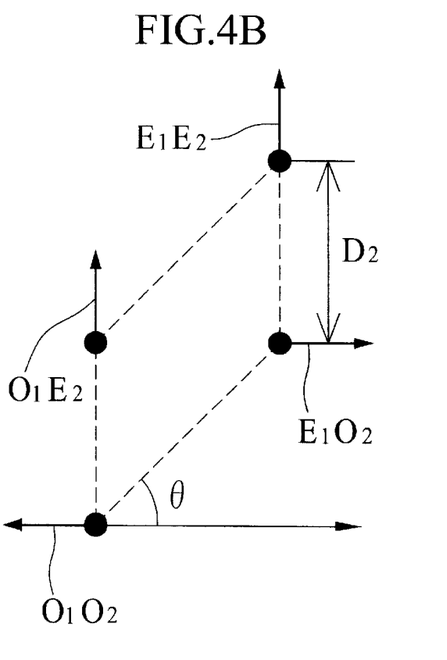

Combining the first and second optical members 11 and 12 in this order from the object side provides the light splitting effect as shown in FIGS. 4A and 4B. That is, the ordinary ray O1 and the extraordinary ray E1 provided through the first optical member 11 enter the second optical member 12, so the ordinary ray O1 is split into an ordinary ray O1O2 and an extraordinary ray O1E2, whereas the extraordinary ray E1 is split into an ordinary ray E1O2 and an extraordinary ray E1E2. Thus, the incident light ray on the optical low-pass filter 10 is split into four rays O1O2, O1E2, E1O2 and E1E2. The intensities of these four rays vary depending upon the respective angles of the principal planes of the optical members 11 and 12. As for the optical low-pass filter of the present embodiment, the intensities may be given as follows:

O1O2=O1 sin θ

O1O2=O1 sin θ

O1E2=O1 cos θ

E1E2=E1 cos θ wherein θ represents the angle of the principal plane to the horizontal scanning direction. Where the angle θ of the principal plane is 45°, the intensities of the four rays come to be equal to each other.

It is to be noted that the angles of the principal planes 15 and 16 of the first and second optical members 11 and 12 may be defined relative to each other insofar as the four rays are projected from the optical low-pass filter at four corners of a parallelogram. That is, the angle of the principal plane 15 or the splitting angle of the first optical member 11 may be −45° to the horizontal scanning direction. Also the angle of the principal plane 16 or the splitting angle of the second optical member 12 may be −90° to the horizontal scanning direction. It is also possible to replace the first and second optical members 11 and 12 with each other.

Now frequency properties (MTF) of the optical low-pass filter of the present invention will be described with reference to FIGS. 5 to 8. In general, MTF of split-off rays that are split by an optical member at a distance or width of D is given as follows:

$$MTF = |\cos(\pi \cdot D \cdot f/Px)|$$

wherein Px represents the sampling pitch, and "f" represent a frequency standardized by the value Px, and MTF is standardized such that the MTF value is 1 for the direct current component (f=0). For example, where d=Px, i.e. where the incident ray is shifted by the sampling pitch, the MTF value becomes 0 at the Nyquist frequency (f=½) according to the frequency properties given by the above formula.

In the horizontal direction, only the horizontal component of the split through the first optical member (D1 sin 45°= Px/2) has an influence on the frequency characteristic. So the frequency characteristic in the horizontal direction may be given by substituting Px/2 for D in the above equation:

$$MTF = |\cos(\pi \cdot f/2)|$$

Figure 5:
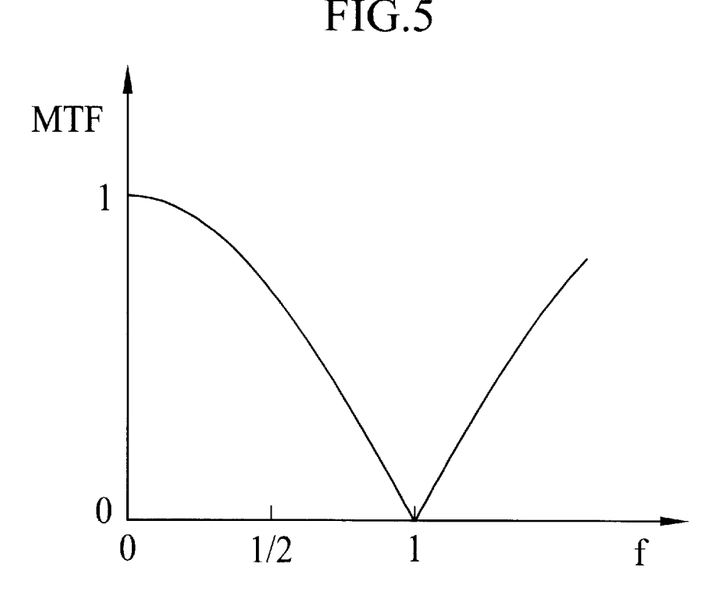
FIG. 5 is a graph illustrating a frequency characteristic in the horizontal direction of the optical low-pass filter of FIG. 1.

As shown in FIG. 5, the frequency characteristics in the horizontal direction is represented by a cosine curve where the MTF value becomes zero at the point of f=1.

In the vertical direction, both the vertical component of the split through the first optical member (D1 cos 45°=Px/2) and the split through the second optical member (D2=Py= Px/2) have influence on the frequency characteristic. So the frequency characteristic in the vertical direction is expressed by the multiple of both:

$$MTF = |\cos(\pi \cdot f/2)|^2$$

Figure 6:
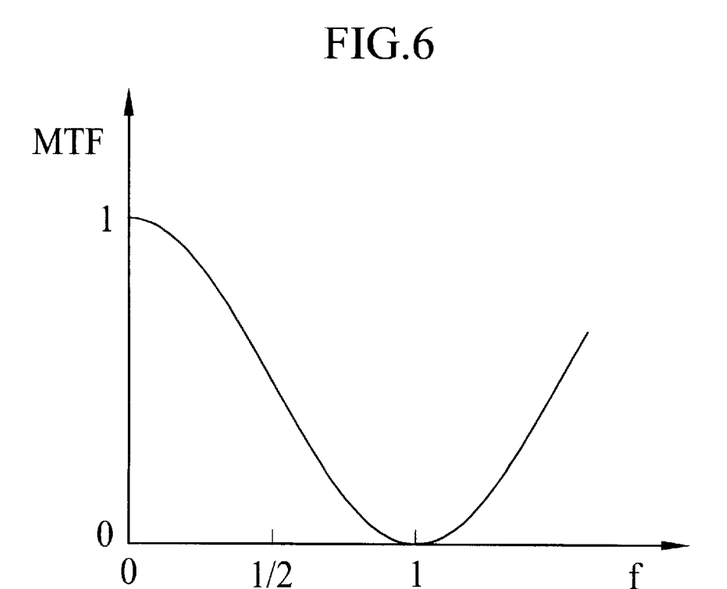
FIG. 6 is a graph illustrating a frequency characteristic in the vertical direction of the optical low-pass filter of FIG. 1.

As shown in FIG. 6, the frequency characteristic in the vertical direction is represented by a curve of cosine² where the MTF value becomes zero at the point of f=1. Comparing to the frequency characteristic in the horizontal direction, the components higher than the Nyquist frequency is more suppressed in the vertical direction, so the influence of the aliasing noise is reduced, though the resolution is lowered because the base band components are also suppressed.

In the direction of +45° to the horizontal direction, the components of +45° of the split through the first and second optical members (D1=Px/√2, and D2 sin 45°=√2 Px/4) have an influence on the frequency characteristic, so it is expressed as follows:

$$MTF = |\cos(\pi \cdot f/\sqrt{2})| \cdot |\cos(\sqrt{2} \cdot \pi \cdot f/4)|$$

Figure 7:
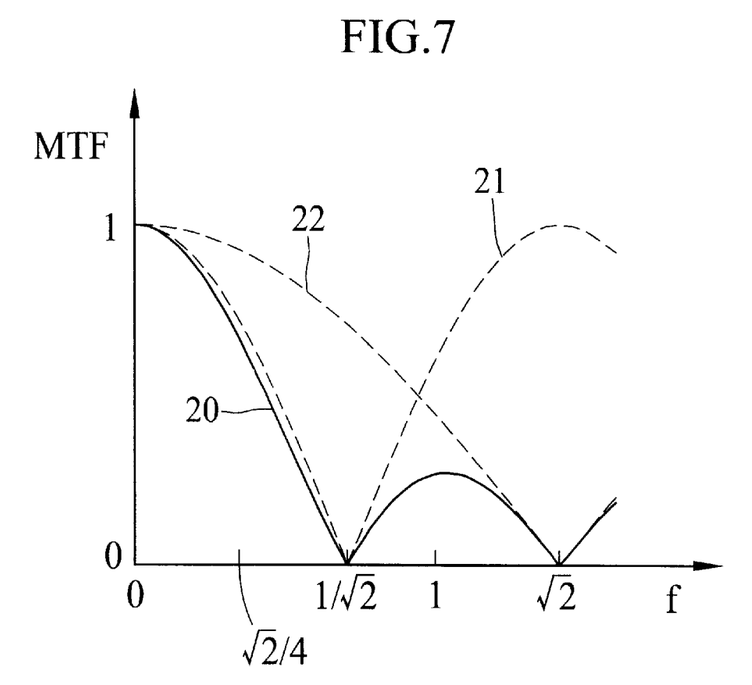
FIG. 7 is a graph illustrating a frequency characteristic in the direction of +45° of the optical low-pass filter of FIG. 1.

FIG. 7 shows the frequency characteristic in the direction of +45° by a solid line curve 20. The curve 20 is a multiple of a cosine curve 21 where MTF value becomes zero at the point of f=1/√2 and a cosine curve 22 where the MTF value becomes zero at the point of f=√2.

In the direction of −45° to the horizontal direction, only the component of −45° of the split through the second optical member (D2 cos 45°=√2·Px/4) has an influence, so the frequency characteristic is expressed as follows:

$$MTF = |\cos(\sqrt{2} \cdot \pi \cdot f/4)|$$

Figure 8:
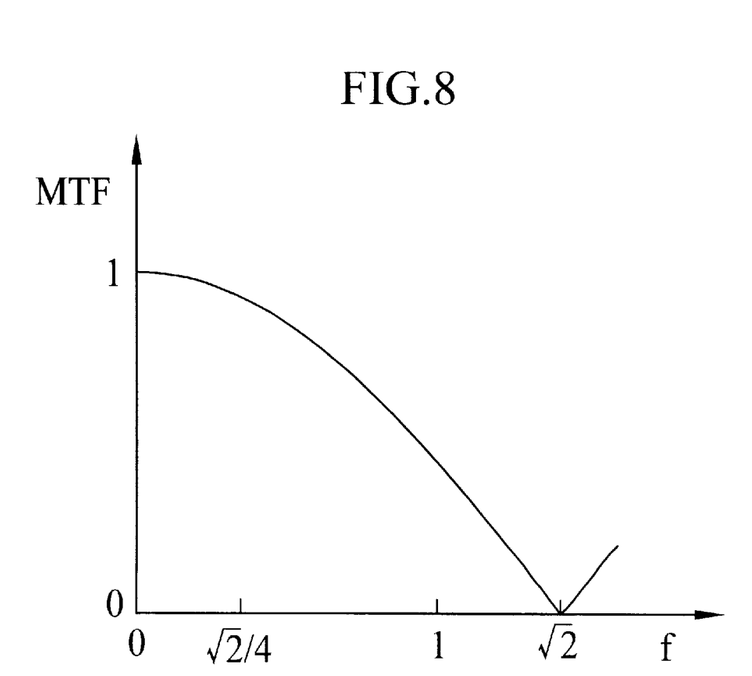
FIG. 8 is a graph illustrating a frequency characteristic in the direction of −45° of the optical low-pass filter of FIG. 1.

FIG. 8 shows the frequency characteristic in the direction of −45°, that is a cosine curve where the MTF value becomes zero at the point of f=√2.

It is understandable from these graphs, the frequency characteristics of the optical low-pass filter the present invention bear comparison with to the frequency characteristics of the prior art, as shown in FIG. 16, in the horizontal and vertical directions, though the optical low-pass filter of the present invention is a little inferior in the direction of −45°. Consequently, the optical low-pass filter of the present invention provides equivalent effects to the prior art, while reducing the number of necessary optical members and thus reducing the thickness of the optical low-pass filter. So the present invention contributes to making the solid-state image sensor compact and saving the cost of the solid-state image sensor, without lowering the performance of the optical low-pass filter.

By making the split width D2 of the second optical member 12 more than Px/2 (=Py), the frequency at which the MTF value becomes zero is shifted to the low frequency side and thus the influence of the aliasing noise is reduced. However, since the frequency characteristics are deteriorated in the vicinity of base band at the same time, the wider split width results in deteriorating the resolution. For this reason, it is desirable to define the split width D2 within the following range:

$$Py \leq D2 \leq 2 \cdot Py$$

Figure 9:
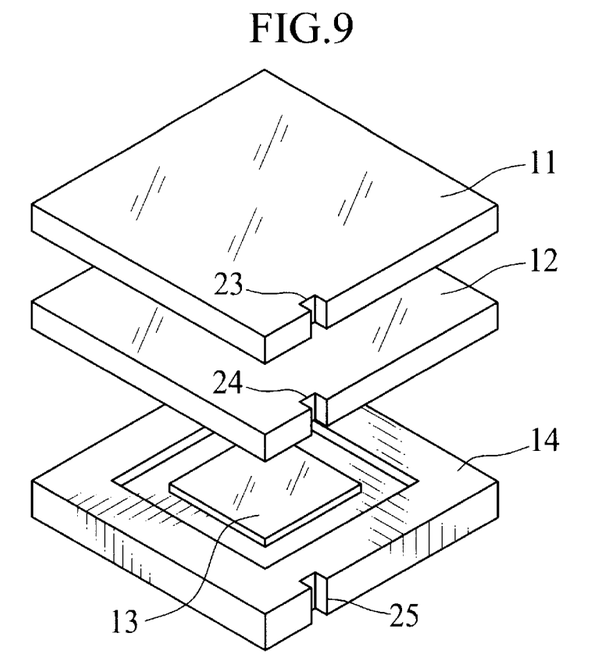
FIG. 9 is an exploded perspective view of optical members of an optical low-pass filter and a solid-state image sensor package, which are provided with positioning notches.

Meanwhile, the frequency characteristics in the respective direction would be changed if either of the optical members 11 and 12 is mounted in the wrong direction or backside front during the manufacture of the optical low-pass filter 10. In that case, the optical low-pass filter 10 is judged to be defective in the inspection even while the optical members 11 and 12 themselves are normal. Therefore, according to a preferred embodiment shown in FIG. 9, the optical members 11 and 12 as well as a sensor package 14 holding the solid-state image sensor 13 are provided with positioning notches 23, 24 and 25 in one sides such that the positioning notches 23 to 25 are brought into alignment with each other when the optical members 11 and 12 are mounted in the proper direction. Thereby, the optical members 11 and 12 are mounted properly with high accuracy and efficiency, so the productivity of the solid-state imaging device is improved.

Figure 10:
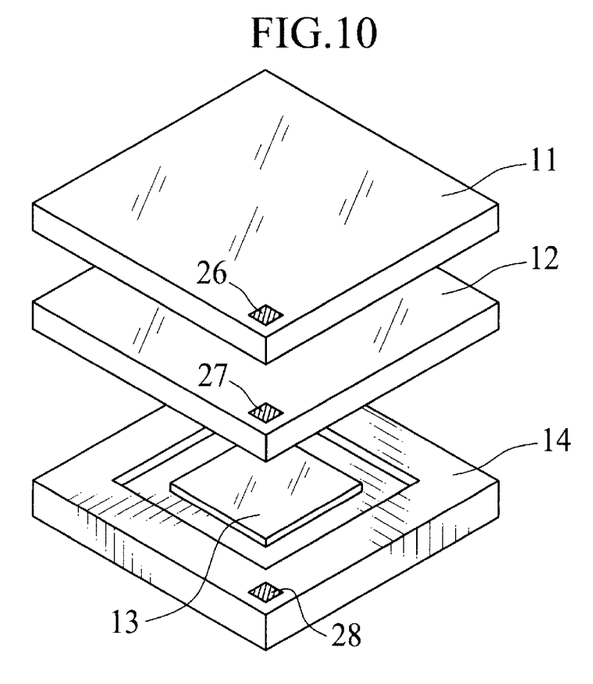
FIG. 10 is an exploded perspective view of optical members of an optical low-pass filter and a solid-state image sensor package, which are provided with positioning marks.

Concerning those optical members whose splitting direction is +90°, like the second optical member 12 of the present embodiment, the characteristics would not be changed even if the optical member is mounted backside front. Therefore, where the optical members 11 and 12 are not square but rectangular, it is possible to mount the optical members 11 and 12 in the proper direction with ease, by providing the positioning notches in the first optical member and the package for the solid-state image sensor alone. It is possible to provide positioning marks 26, 27 and 28 instead of providing the positioning notches, as shown in FIG. 10, for obtaining the same effect.

Figure 11:
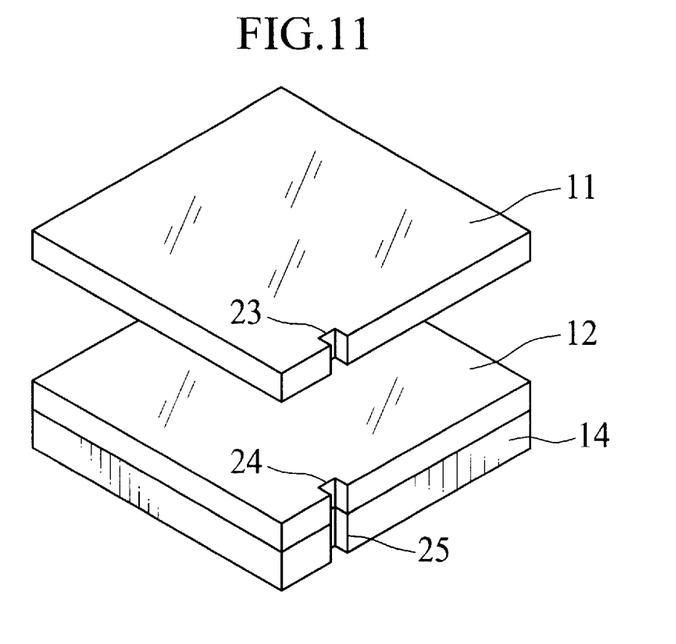
FIG. 11 is a perspective view of another embodiment of an optical low-pass filter, of which second optical member is bonded to a solid-state image sensor package.

The solid-state image sensor in general is covered with a glass protective plate that is conventionally mounted on the obverse side of the package. According to another preferred embodiment of the present invention, the first optical member is served also as a protective plate. Since the specific glass protective plate is omitted, the thickness of the solid-state image sensor is reduced more. FIG. 11 shows an example of this embodiment, wherein the second optical member 12 and the sensor package 14 are bonded to be an integral part, and the first optical member 11 is placed in front of the integral part.

Since the risk of lowering the yield is increased by the process of bonding the second optical member to the package, it is preferable to use the optical member whose beam-splitting direction is 90° for the second optical member that is bonded to the package, because those optical members whose splitting direction is 0° or 90° are cheaper than other types. That is, integrating the cheaper optical member with the package minimizes the increase in the manufacturing cost by the defective products. The reason why those optical members whose beam-splitting direction is 0° or 90° are cheaper than other types is because the rectangular or square optical members can be cut off from the raw material, e.g. the rock crystal, at the highest density when their beam-splitting direction is 0° or 90°.

Although the angle θ is designed to be 45° in the above embodiment where the pitch Px in the horizontal direction of the solid-state image sensor 13 of the offset sampling structure is designed to be twice the pitch Py in the horizontal direction, the angle θ may be a value around +45° or −45°. The angle of the principal plane of the second optical member to the horizontal scanning direction may also be a value around +90° or −90°. Also the split width D1 of the first optical member 11 may be a value around Px/√2.

Figure 12:
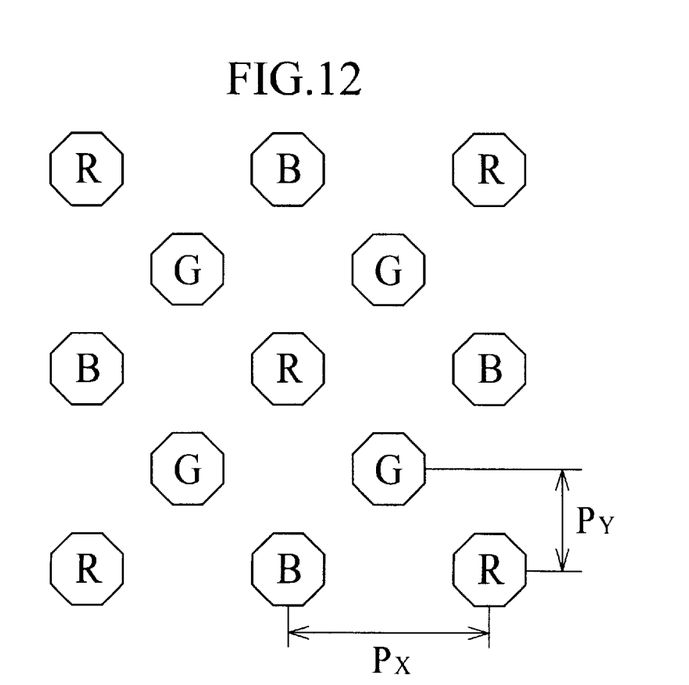
FIG. 12 is an explanatory diagram illustrating an example of an array of three color pixels of a color solid-state image sensor of the offset sampling structure.

The optical low-pass filter of the present invention is also applicable to a color solid-state imaging device having an offset sampling structure as shown for example in FIG. 12, for preventing the color moiré and spurious color that would be caused by the aliasing noise.

The optical members constituting the optical low-pass filter of the present invention are not to be limited to birefringent plates, but may be any optical members that split a beam into two parts of different directions, such as a color separation prism.

Thus, the present invention is not to be limited to the above embodiment but, on the contrary, various modifications will be possible to those skilled in the art without departing from the scope of claims appended hereto.

What is claimed is:

1. An optical low-pass filter for use in front of a solid-state image sensor of an offset sampling structure wherein pixels are arrayed at a pitch Px in a horizontal direction and at a pitch Py in a vertical direction, and are shifted by an offset amount of Px/2 in the horizontal direction from the pixels of the adjacent rows, said optical low-pass filter consisting of two birefringent plates, the two birefringent plates comprising:

a first optical member that splits an incident light ray into a rectilinear ray and a refracted ray whose propagation direction is about 45° or about −45° to the horizontal direction; and a second optical member that splits an incident ray into a rectilinear ray and a refracted ray whose propagation direction is about 90° or about −90° to the horizontal direction.

2. The optical low-pass filter as claimed in claim 1, wherein respective split widths D1 and D2 of the incident light rays through said first and second optical members satisfy the following conditions:

$$D1 = Px/\sqrt{2}$$

$$Py \leq D2 \leq 2 \cdot Py.$$

3. The optical low-pass filter as claimed in claim 1, wherein said second optical member is bonded to a front side of said solid-state image sensor, and said first optical member is mounted in front of said second optical member.

4. The optical low-pass filter as claimed in claim 1, wherein each of said first and second optical members and said solid-state image sensor is provided with a positioning notch or a positioning mark such that said first and second optical members are positioned properly relative to said solid-state image sensor by aligning said positioning notches or marks with each other.

5. The optical low-pass filter as claimed in claim 1, wherein the second optical member serves as a protective plate for the solid-state image sensor.

6. An optical low-pass filter for use in front of a solid-state image sensor of an offset sampling structure wherein pixels are arrayed at a pitch Px in a horizontal direction and at a pitch Py in a vertical direction, and are shifted by an offset amount of Px/2 in the horizontal direction from the pixels of the adjacent rows, said optical low-pass filter comprising:

a first optical member that splits an incident light ray into a rectilinear ray and a refracted ray whose propagation direction is about 45° or about −45° to the horizontal direction; and a second optical member that splits an incident ray into a rectilinear ray and a refracted ray whose propagation direction is about 90° or about −90° to the horizontal direction, wherein respective split widths D1 and D2 of the incident light rays through said first and second optical members satisfy the following conditions:

$$D1 = Px/\sqrt{2}$$

$$Py \leq D2 \leq 2 \cdot Py.$$

7. An optical low-pass filter for use in front of a solid-state image sensor of an offset sampling structure wherein pixels are arrayed at a pitch Px in a horizontal direction and at a pitch Py in a vertical direction, and are shifted by an offset amount of Px/2 in the horizontal direction from the pixels of the adjacent rows, said optical low-pass filter comprising:

a first optical member that splits an incident light ray into a rectilinear ray and a refracted ray whose propagation direction is about 45° or about −45° to the horizontal direction; and a second optical member that splits an incident ray into a rectilinear ray and a refracted ray whose propagation direction is about 90° or about 90° to the horizontal direction, wherein said second optical member is bonded to a front side of said solid-state image sensor, and said first optical member is mounted in front of said second optical member.

* * * * *